United States Patent
Liu et al.

(10) Patent No.: US 11,016,630 B2
(45) Date of Patent: May 25, 2021

(54) VIRTUAL VIEW-WINDOW

(71) Applicant: International Business Machines Corporation, Armonk, NY (US)

(72) Inventors: Su Liu, Austin, TX (US); Eric Rozner, Boulder, CO (US); Inseok Hwang, Austin, TX (US); Cliff Chin Ngai Sze, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/263,311

(22) Filed: Jan. 31, 2019

(65) Prior Publication Data

US 2020/0249816 A1    Aug. 6, 2020

(51) Int. Cl.
 G06F 3/0481 (2013.01)
 H04W 4/02 (2018.01)
 G06T 19/00 (2011.01)

(52) U.S. Cl.
 CPC ........ *G06F 3/04815* (2013.01); *G06T 19/006* (2013.01); *H04W 4/02* (2013.01)

(58) Field of Classification Search
 None
 See application file for complete search history.

(56) References Cited

U.S. PATENT DOCUMENTS

| 7,116,801 | B2 | 10/2006 | Lin |
| 7,856,121 | B2 | 12/2010 | Lin |
| 8,810,599 | B1 | 8/2014 | Tseng |
| 9,164,577 | B2 | 10/2015 | Tapley |
| 2008/0158366 | A1* | 7/2008 | Jung ................. H04N 1/00244 348/207.1 |
| 2010/0157063 | A1* | 6/2010 | Basso ...................... G09F 9/35 348/169 |

(Continued)

FOREIGN PATENT DOCUMENTS

| CN | 102353351 B | 1/2014 |
| WO | 2016025053 A2 | 2/2016 |

OTHER PUBLICATIONS

"Google Virtual Tour Pricing", Merchant View360, Accessed on Sep. 27, 2018, 2:48 PM, © 2014 Copyright EveryMerchant.com, 4 pages, <https://merchantview360.com/pricing/>.

(Continued)

*Primary Examiner* — Jeffrey J Chow
(74) *Attorney, Agent, or Firm* — Isaac J. Gooshaw; William H. Hartwell

(57) ABSTRACT

Interactive augmented reality system is provided. A first geographical location and a first environmental characteristic is monitored by a user device. A viewpoint of the user device is determined based, at least in part, on (i) the first geographical location and (ii) the first environmental characteristic. A digital image request is generated based, at least in part, on (i) the first geographical location and (ii) the first environmental characteristic. A digital image is identified from a database based, at least in part, on (i) a second geographical location and (ii) a second environmental characteristic associated with the digital image request. In response to identifying the digital image based, at least in part, on the digital image request populating the user device with the digital image.

20 Claims, 4 Drawing Sheets

(56) References Cited

U.S. PATENT DOCUMENTS

| | | | | |
|---|---|---|---|---|
| 2014/0300775 | A1* | 10/2014 | Fan | H04N 1/32128 |
| | | | | 348/231.3 |
| 2015/0235398 | A1 | 8/2015 | Kim | |
| 2015/0304588 | A1* | 10/2015 | Jung | G06F 16/51 |
| | | | | 348/552 |
| 2018/0061133 | A1* | 3/2018 | Wu | H04W 4/70 |
| 2018/0122142 | A1* | 5/2018 | Egeler | G06F 3/011 |
| 2019/0236844 | A1* | 8/2019 | Balasian | G06Q 10/20 |
| 2019/0297461 | A1* | 9/2019 | Charlton | G06K 9/6215 |
| 2019/0325653 | A1* | 10/2019 | Yip | G06T 19/006 |
| 2019/0378242 | A1* | 12/2019 | Zhang | G06T 3/4061 |

OTHER PUBLICATIONS

"Picture Quality Analysis: Real-Time Measurements for Objective Video Quality", National Instruments, Publish Date: Apr. 5, 2018, © 2018 National Instruments, 4 pages, <http://www.ni.com/product-documentation/12703/en/>.

"Sky Map", Google Play, Updated Sep. 6, 2018 © 2018 Google, 3 pages, <https://play.google.com/store/apps/details?id=com.google.android.stardroid&hl=en>.

"Street View", Google Maps, Accessed on Sep. 27, 2018, 2:44 PM, 3 pages, <https://www.google.com/streetview/earn/>.

"What Is Google Business Photos 360 Virtual Tour Explained", YouTube, Posted by Pro Media 360, Published on Aug. 26, 2013, 2 pages, <https://www.youtube.com/watch?v=ZCXRf-CCtqs>.

Arthur, Charles, "Augmented reality: it's like real life, but better", The Guardian, Technology, Sat Mar. 20, 2010 20.05 EDT, 3 pages, <https://www.theguardian.com/technology/2010/mar/21/augmented-reality-iphone-advertising>.

Herman, John, "Augmented Reality Yelp Will Murder All Other iPhone Restaurant Apps, My Health", Gizmodo, Aug. 27, 2009 4:21pm, 2 pages, <https://gizmodo.com/5347194/augmented-reality-yelp-will-murder-all-other-iphone-restaurant-apps-my-health>.

Kafka, Peter, "Look at This! We're Uploading and Sharing a Staggering 1.8 Billion Photos a Day", recode, May 28, 2014, 9:08am EDT, 2 pages, <https://www.recode.net/2014/5/28/11627316/look-at-this-were-uploading-and-sharing-a-staggering-1-8-billion>.

Sun et al., "Gait Characteristic Analysis and Identification Based on the iPhone's Accelerometer and Gyrometer", Sensors, 14, Published: Sep. 12, 2014, © 2014 by the authors; licensee MDPI, Basel, Switzerland, p. 17037-17054.

* cited by examiner

VIRTUAL VIEW-WINDOW

BACKGROUND OF THE INVENTION

The present invention relates generally to the field of augmented reality, and more particularly to machine vision.

As technology evolves, the prevalence of an interactive experience of a real-world environment, wherein the objects that reside in the real-world may be augmented has increased, creating an augmented reality ("AR"). The overlain sensory information is seamlessly woven with the physical world to create an immersive aspect of the real environment. As the popularity of AR rises, so does the requirement for machine visions to integrate the use of image processing. Information extracted from an image is processed, and the result creates an output based on assigned contextual parameters.

SUMMARY

Embodiments of the present invention provide a method to execute an interactive augmented reality based on environmental characteristics.

A first embodiment encompasses a method for an augmented reality for a machine vision program. One or more processors monitor (i) a first geographical location and (ii) a first environmental characteristic of a user device. One or more processors determine a viewpoint of the user device based, at least in part, on (i) the first geographical location and (ii) the first environmental characteristic. One or more processors generate a qualified photo request based, at least in part on (i) the first geographical location and (ii) the first environmental characteristic. One or more processors identify a digital image from a database based, at least in part, on (i) a second geographical location and (ii) a second environmental characteristic associated with the digital image request. One or more processors respond to identifying the digital image based, at least in part, on the digital image request populating the user device with the digital image. One or more processors identify the first environmental characteristic of the user device that is associated with a machine vision sensor based, at least in part, on a program code, wherein the program code associates each of a plurality of machine vision sensor with the first environmental characteristic. One or more processors execute a program for the machine vision sensor based, at least in part, on the first environmental characteristic, wherein the program associates each of a plurality of machine vision sensor with the first environmental characteristic of the user device. One or more processors retrieve one or more digital image from (i) at least one augmented reality gaming services or (ii) at least one web-based social media sharing service. One or more processors store the one or more digital image on a database. One or more processors organize the one or more digital image based, at least in part, on (i) a second geographical location and (ii) a second environmental characteristics. One or more processors analyze the digital image request received from the user device. One or more processors identify the digital image based, at least in part, on (i) the second geographical location and (ii) the second of environmental characteristics, wherein the digital image has one or more required characteristics associated with (i) the second geographical location and (ii) the second of environmental characteristics. One or more processors match the digital image with the following: (i) the first geographical location and (ii) the first environmental characteristic of the user device. One or more processors retrieve the digital image with the following: (i) the first geographical location and (ii) the first environmental characteristic of the user device. One or more processors send the digital image to the user device. One or more processors populate a display screen of the user device with the digital image. One or more processors receive a feedback interaction by the user device regarding the digital image. One or more processors update at least one preference by the user based on the feedback interaction.

A second embodiment encompasses a computer program product for an augmented reality for a machine vision program. The computer program product includes one or more computer-readable storage media and program instructions stored on the one or more computer-readable storage media. The program instructions include program instructions to monitor i) a first geographical location and (ii) a first environmental characteristic of a user device. The program instructions include program instructions to determine a viewpoint of the user device based, at least in part, on (i) the first geographical location and (ii) the first environmental characteristic. The program instructions include program instructions to generate a digital image request based, at least in part, on (i) the first geographical location and (ii) the first environmental characteristic. The program instructions include program instructions to identify a digital image from a database based, at least in part, on (i) a second geographical location and (ii) a second environmental characteristic associated with the digital image request. The program instructions include program instructions to respond to identifying the digital image based, at least in part, on the digital image request populating the user device with the digital image.

A third embodiment encompasses a computer system for disaster recovery protocol a virtual storage system. The computer system includes one or more computer processors, one or more computer readable storage medium, and program instructions stored on the computer readable storage medium for execution by at least one of the one or more processors. The program instructions include program instructions to monitor (i) a first geographical location and (ii) a first environmental characteristic of a user device. The program instructions include program instructions to determine a viewpoint of the user device based, at least in part, on (i) the first geographical location and (ii) the first environmental characteristic. The program instructions include program instructions generate a digital image request based, at least in part, on (i) the first geographical location and (ii) the first environmental characteristic. The program instructions include program instructions identify a digital image from a database based, at least in part, on (i) a second geographical location and (ii) a second environmental characteristic associated with the digital image request. The program instructions include program instructions to respond to identify the digital image based, at least in part, on the digital image request populating the user device with the digital image.

DETAILED DESCRIPTION

Figure 1:
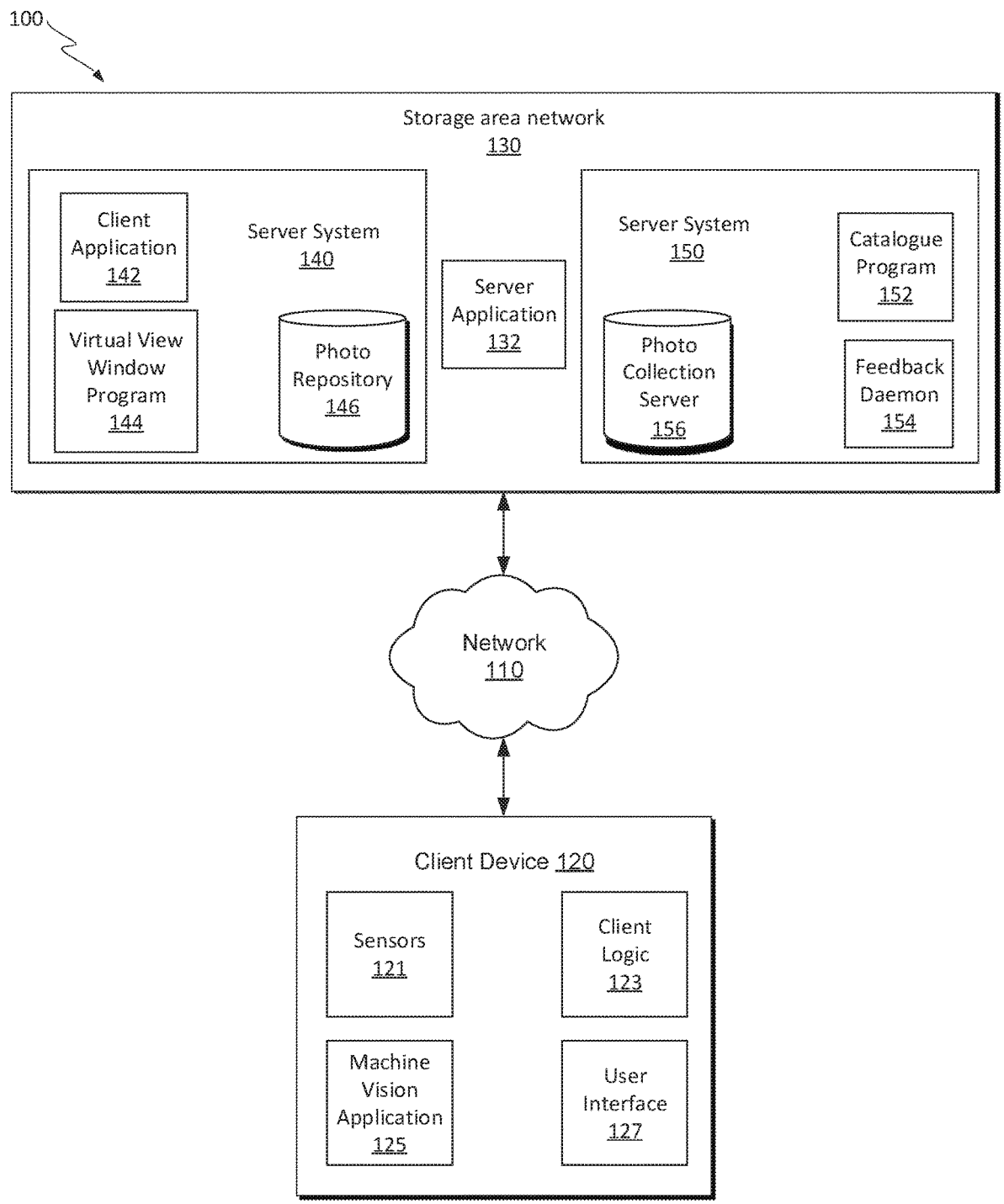
FIG. 1 is a functional block diagram illustrating a computing environment, in which an augmented reality system retrieves a photograph depicting the environmental characteristics of a computing device.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the s are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While possible solutions to augmented reality are known, these solutions may be inadequate to provide the necessary service to create a virtual view-window, because these solutions do not provide a photograph management service to select a qualified photograph based on real-time. Further, these solutions to not provide a system to analyze photo objects and determine the quality, based upon a collection of photographs in augmented reality ("AR").

Embodiments of the present invention recognize that augmented reality programs generally enhance natural environments and offer perceptual enhancements of the real world through a virtual lens. In addition, users typically want to be fully immersed in this virtually enhanced reality.

In general, augmented reality is the method of using real-time or visual representations of the real-world and projecting these onto a screen and augmenting these depictions of the real-world by overlaying different graphics. As an example, users may take a photograph and overlay different computer-generated graphics onto the photograph to create an augmented reality. While augmented reality methods have evolved over the years, most solutions focus on how to augment photographs or live streams without reliance on the user's location. These augmented reality methods offer limited access and immersion to the user and prevent the user from being aware of their current surroundings. Without the addition of analyzing the user's location or other characteristics of the user's surroundings, it may be impossible to fully immerse the user in augmented reality.

In one embodiment, an interactive augmented reality program is provided. In one embodiment, a device monitors (i) a first geographical location and (ii) a first environmental characteristic of the user device. A viewpoint of the user device is determined based, at least in part, on (i) the first geographical location and (ii) the first environmental characteristic. A digital image request is generated based, at least in part, on (i) the first geographical location and (ii) the first environmental characteristic. A digital image is identified from a database based, at least in part, on (i) a second geographical location and (ii) a second environmental characteristic associated with the digital image request. In response to identifying the digital image based, at least in part, on the digital image request, populating the user device with the digital image.

In one embodiment of the present invention, the first environmental characteristic of the user device is identified that is associated with a machine vision sensor based, at least in part, on program code, wherein the program code associates each of a plurality of machine vision sensor with the first environmental characteristic. A program for the machine vision sensor is executed on the first environmental characteristic, wherein the program associates each of a plurality of machine vision sensor with the first environmental characteristic of the user device. In some embodiments, one or more digital images is retrieved from (i) at least one augmented reality gaming services or (ii) at least one web-based social media sharing service. Additionally, the one or more digital images is stored on a database. In some embodiments, the one or more digital images are organized based, at least in part, on (i) a second geographical location and (ii) a second environmental characteristics.

In one embodiment, the digital image request is analyzed by the user device. The digital image is identified based, at least in part, on (i) the second geographical location and (ii) the second of environmental characteristics, wherein the digital image has one or more required characteristics associated with (i) the second geographical location and (ii) the second of environmental characteristics. The digital image is matched with the following: (i) the first geographical location and (ii) the first environmental characteristic of the user device, and the digital image is retrieved from the database.

In one embodiment, the digital image is sent to the user device, and the digital image is populated on a display screen of the user device. A feedback interaction is received by the user device regarding the digital image, and at least one preference by the user is updated based on the feedback interaction.

The present invention will now be described in detail with reference to the Figures.

FIG. 1 is a functional block diagram illustrating a computing environment, generally designated 100, in accordance with one embodiment of the present invention. Computing environment 100 includes client device 120 and storage area network (SAN) 130 connected over network 110. Client device 120 includes sensors 121, client logic 123, machine vision application (MVA) 125, user interface 127. SAN 130 includes server system 140 and server system 150. Client logic 124 and user interface 127 include program instructions to perform the functions of the invention as described herein.

In various embodiments of the present invention, client device 120 is a computing device that can be a standalone device, a server, a laptop computer, a tablet computer, a netbook computer, a smartphone, a personal computer (PC), a personal digital assistant (PDA), smartwatch, a desktop computer, or any programmable electronic device capable of receiving, sending, and processing data. In general, client device 120 represents any programmable electronic device or combination of programmable electronic devices capable of executing machine readable program instructions and communicating with SAN 130, server system 140 and/or server system 150, and other computing devices (not shown) within computing environment 100 via a network, such as network 110. In another embodiment, client device 120 represents a computing system utilizing clustered computers and components to act as a single pool of seamless resources. In general, client device 120 can be any computing device or a combination of devices with access to storage area network 130 and network 110 and is capable of executing client logic 123, MVA 125, user interface 127. Client device 120 may include internal and external hardware components, as depicted and described in further detail with respect to FIG. 1.

In this exemplary embodiment, client application 142, virtual view window program 144, catalogue program 152, feedback daemon 154 and server application 132 are stored on photo repository 146. However, in other embodiments, client application 142, virtual view window program 144, catalogue program 152, feedback daemon 154 and server application 132 may be stored externally and accessed through a communication network, such as network 110. Network 110 can be, for example, a local area network (LAN), a wide area network (WAN) such as the Internet, or a combination of the two, and may include wired, wireless, fiber optic or any other connection known in the art. In general, network 110 can be any combination of connections and protocols that will support communications between client device 120 and SAN 130, in accordance with a desired embodiment of the present invention.

Client device 120 includes user interface 127. User interface 127 provides an interface between client device 120, SAN 130, server system 140, and server system 150. In some embodiments, user interface 127 can be a graphical interface (GUI) or a web user interface (WUI) and can display text, documents, web browser, windows, user options, application interfaces, and instructions for operation, and includes the information (such as graphic, text, and sound) that a program presents to a user and the control sequences the user employs to control the program. In some embodiments, client device 120 accesses data communicated from SAN 130, server system 140, and server system 150 via client-based application that runs on client device 120. For example, client device 120 includes mobile application software that provides an interface between client device 120 and SAN 130, server system 140, and server system 150.

In this exemplary embodiment, sensors 121, client logic 123, MVA 125, user interface 127 are stored on client device 120. However, in other embodiments, sensors 121, client logic 123, MVA 125, user interface 127 may be stored externally and accessed through a communication network, such as network 110. Network 110 can be, for example, a local area network (LAN), a wide area network (WAN) such as the Internet, or a combination of the two, and may include wired, wireless, fiber optic or any other connection known in the art. In general, network 110 can be any combination of connections and protocols that will support communications between client device 120 and SAN 130, in accordance with a desired embodiment of the present invention.

SAN 130 is a storage system that includes server system 140, server system 150, and server application 132. SAN 130 may include one or more, but is not limited to, computing devices, servers, server-cluster, web-servers, database and storage devices. SAN 130 operates to communicate with client device 120 over a network, such as network 110. For example, SAN 130 communicates with client device 120 to transfer data between, but is not limited to, server system 140 and server system 150. The present invention recognizes that FIG. 1 may include (not shown) any number of computing devices, servers, databases and/or storage devices, and the present invention is not limited to what is depicted in FIG. 1.

In various embodiments of the present invention, SAN 130 is a computing device that can be a standalone device, a server, a laptop computer, a tablet computer, a netbook computer, a smartphone, a personal computer (PC), or a desktop computer. In another embodiment, SAN 130 represents a computing system utilizing clustered computers and components to act as a single pool of seamless resources. In general, SAN 130 can be any computing device or a combination of devices with access to client device 120 and network 110 and is capable of executing client application 142, virtual view window program 144, catalogue program 152, and feedback daemon 154. Catalogue program 152 and feedback daemon 154 include program instructions to perform the functions of the invention as described herein. SAN 130 may include internal and external hardware components, as depicted and described in further detail with respect to FIG. 1.

Server system 140 and server system 150 are depicted in FIG. 1 for illustrative simplicity, however, server system 140 and server system 150 can include any number of databases that are managed in accordance with server application 132. In general, photo repository 146 and photo collection server 156 represents data and virtual view window program 144, catalogue program 152, feedback daemon 154, and/or server application 132 manages the ability to view the data. In other embodiments, virtual view window program 144, catalogue program 152, feedback daemon 154, and/or server application 132 represents code that provides an ability to take specific action with respect to another physical or virtual resource and client application 142, virtual view window program 144, catalogue program 152, feedback daemon 154, and/or server application 132 manages the ability to use and modify the data. Client application 142 can also represent any combination of the aforementioned features, in which virtual view window program 144, catalogue program 152, feedback daemon 154, and/or server application 132 has access to user interface 127. To illustrate various aspects of the present invention, examples of user interface 127 are presented in which user interface 127 represents one or more of, but is not limited to, a desktop environment and social media account.

In the embodiment depicted in FIG. 1, server application 132, at least in part, has access to user interface 127 and can communicate data stored on SAN 130 to client device 120. More specifically, user interface 127 defines a user of client device 120 that has access to data stored on photo repository 146 and photo collection server 156.

In the embodiment depicted in FIG. 1, client logic 123 utilizes, at least in part, the data stored on photo repository 146 and photo collection server 156 to manage access to user interface 127 in response to real-time photo requests from client device 120 (i.e., from user of client device 120, alternatively referred to herein as "requestor"). More specifically, client logic 123 defines a real-time photo hierarchy that represents various client-device variables and that associates certain photo characteristics with certain device sensors associated with client device 120.

Client logic 123, MVA 125, and user interface 127 are depicted in FIG. 1 for illustrative simplicity, client device 120, however, can include any number of logics and/or applications that are managed in accordance with client logic 123. In general, client logic 123 represents a physical or virtual resource to which the user represented by client device 120 wishes to manage access. In some embodiments, client logic 123 represents information and user interface 127 manages the ability to view the information. In other embodiments, client logic 123 represents code that provides an ability to take specific action with respect to another physical or virtual resource and user interface 127 manages the ability to take such actions. In yet other embodiments, client logic 123 represents control over a physical or virtual resource and user interface 127 manages the ability to use and modify the resource. Client logic 123 can also represent any combination of the aforementioned elements/To illustrate various aspects of the present invention, examples of client logic 123 are presented in which client logic 123 represents one or more of: a real-time photo transaction, a user profile transaction, or an AR photo transaction, are presented, but embodiments of client logic 123 are not limited thereto. Embodiments of the present invention recognize that client logic 123 may include other forms of transactions that are known in the art.

In the embodiment depicted in FIG. 1, client device 120 operates to augment reality utilizing, at least in part, data stored on server system 140 and server system 150. More specifically, server system 140 and server system 150 stores (i) various photos obtained throughout the internet, (ii) application logic, and (iii) user preferences. To illustrate various aspects of the present invention, examples of an augmented reality application are presented in which am augmented reality represents one or a combination of a database and a computer program, are presented. However, embodiments of an augmented reality application are not limited thereto. In various embodiments, an augmented reality application encompasses any computing resource, or combination of computing resources, that are configured to carry out augmentation of reality using the processes described herein. Embodiments of the present invention recognize that computing environment 100 may include other forms of computing devices that are known in the art.

In various embodiments depicted in FIG. 1, client device 120 is a computing device that can be a standalone device, a server, a laptop computer, a tablet computer, a netbook computer, a personal computer (PC), a desktop computer, a smartphone, a personal digital assistant (PDA), or a smartwatch. In another embodiment, client device 120 represents a computing system utilizing clustered computers and components to act as a single pool of seamless resources. In general, client device 120 can be any computing device or a combination of devices with access to server application 132, client application 142, virtual view window program 144, photo repository 146, catalogue program 152, feedback daemon 154, and photo collection server 156. In general, client device 120 represents a computing device that can detect and analyze the location of the device via sensors 121 and communicate with server system 140 and server system 150, such that a user of client device 120 (i.e., a requestor) can request a real-time photo with server system 140 and server 150. Accordingly, client logic 123 operates to transmit a real-time photo transaction requests to server system 140 and server system 150 and configure client device 120 and/or present any feedback (i.e., coaching) that client device 120 receives from client application 142 in response to the real-time photo transaction request. In some embodiments, client logic 123 also represents one or more elements of client application 132. For example, client logic 123 can include functionality for determining whether or not a qualified photo can be utilized to create am augmented reality and populate the qualified photo on client device 120, user interface 127, as described herein. User interface 127 can also represent a user interface ("UI") that operates to provide a UI (e.g., a graphical interface ("GUI")) to a user of client device 120. In certain such embodiments, the UI of user interface 127 operates to receive user input from the user of client device 120, thereby enabling the user to interact with client logic 123 executing on client device 120. In certain such embodiments, the UI of client logic 123 can also operate to enable the user to access and/or interact with SAN 130 through the authentication of the user via server application 132. In certain such embodiments, it is to be understood that computing environment 100 can include a plurality of client device 120 without departing from the scope of the present invention.

In some embodiments depicted in FIG. 1, client device 120 communicates with SAN 130 based, at least in part, on client logic 123 and user interface 127. Client logic 123 generates a real-time photo request based, at least in part, but is not limited to, the device's location, environment characteristics, and photo quality. User interface 127 communicates the real-time photo request to virtual view window program 144. Client logic 123 determines that a real-time photo request is communicated to SAN 130 based, at least in part, on data obtained from sensors 121 and MVA 125.

In various embodiments, sensors 121 operate to monitor the geographical location of client device 120. In some embodiments and scenarios, the geographical location includes positional data and directional data. For example, positional data includes coordinate data and/or another coordinate system that describes the positional or location of client device 120. As another example, directional data includes the cardinal or compass direction of client device 120 or any other information indicative of a direction or viewing angle of client device 120. In some embodiment and scenarios, the positional data and directional data are combined to create a viewpoint associated with client device 120. A viewpoint is a cone or viewing angle of client device 120 that includes the location and direction of client device 120. One having ordinary skill in the art will recognize that sensors of a computing device are device, module, or subsystem whose purpose is to detect events or changes in an environment and elevation and send the data to various computing devices. Sensors 121 include, but are not limited to, global positioning system (GPS), a compass, gravitational accelerator, gyro-meter, photoconductive cell, and a light dependent resistor (LDR). In some embodiments, MVA 125 operates to monitor the environment context characteristics of client device 120. MVA 125 monitors the environment characteristics of client device 120 for changes which include, but limited to, being inside of a building, a focused object, or an event taking place. Sensors 121 and machine vision application 125 communicate the data obtained to client logic 123 and/or virtual view window program 144. Client logic 123 utilizes the data to generate a real-time photo request, based at least in part, on the geographical location and environment characteristics of client device 120. In some embodiments, sensors 121 and MVA 125 communicate the data to virtual view window program 144, where virtual view window program 144 utilizes the data based, at least in part, on the real-time photo request received from client logic 123 to identify a qualified photo from photo collection server 156.

In various embodiments depicted in FIG. 1, client device 120 utilizes sensors 121 and MVA 125 to determine the geographical location and environment characteristics of client device 120. MVA 125 include, but are not limited to, GPS, a compass, gravitational accelerator, gyro-meter, photoconductive cell, light dependent resistor (LDR), and limit switch. MVA 125 is a device used to extract data from an image which includes, but is not limited to, the identity, position, and orientation of each object in an image. Based on the features as previously mentioned, and persons of ordinary skill in the art will understand that sensors MVA 125 can be used to determine the environmental characteristics and elevation of client device 120. Additionally, based on the features previously mentioned, and persons of ordinary skill in the art will understand that MVA 125 can be used to determine the identity, position, and orientation of each object in an image and extract the data and populates a user interface and/or communicates the data to an application for analysis. Environmental characteristics may be generally understood to be detectable features extracted from the viewport of client device 120. In some embodiments, environmental characteristics can be, but are not limited to, text or words and/or objects: walls, windows, structures, buildings, plant life, wildlife, furniture, and vehicles.

In various embodiments depicted in FIG. 1, MVA 125 operates to determine whether client device 120 is located within a building, venue, structure, or the like and/or is located in an open environment. Based on the operations as previously mentioned, and persons of ordinary skill in the art will understand that MVA 125 extracts data such as the identity of a wall, or the position and orientation of windows to determine that client device 120 is located within a building, venue, structure, or the like. MVA 125 operates to analyze the data that was extracted and determines if client device 120 is located within a building, venue, structure, or the like. MVA 125 communicates this data to client logic 123, wherein client logic 123 based, at least in part, on the request generated by user interface 127, generates a real-time photo request that is submitted to virtual view window program 144. For example, MVA 125 operates to identify that there is a wall, carpet and windows in front of client device 120. Furthermore, MVA 125 identifies that in the frame of the window is a landscape depicting various, trees, roads, structures, vehicles and/or persons. MVA 125 identifies that because the landscape is within the frame of the window, MVA 125 determines that client device 120 is inside a building and communicates this data to various computing devices as recognized above. In addition to the features recognized above, sensors 121 operates to determine that the geographical location of client device 120 is viewing in an eastward position. Sensors 121 communicates the data to client logic 123 and/or virtual view window program 144.

In various embodiments, client logic 123 generates a real-time photo request based, at least in part, on the geographical location and environmental characteristics of client device 120, as recognized above. In some embodiments, a user of client device 120 is prompted to make a selection utilizing user interface 127 to interact with client device 120. User interface 127 prompts the user of client device 120 to position client device 120 at a certain angle, orientation and/or position for sensors 121 and MVA 125 to gather data of the geographical location and environmental characteristics of client device 120. Sensors 121 and MVA 125 communicate the data to client logic 123. Upon generating a real-time photo request, client logic 123 communicates a real-time photo request to virtual view window program 144 utilizing network 110.

In various embodiments, virtual view window program 144, receives a real-time photo request from client device 120. Virtual view window program 144 utilizes user preferences stored on client application 142 and the data from a real-time photo request to retrieve a qualified photo from photo collection server 156. Virtual view window program 144 analyzes (i) the user preferences stored on client application 142 and (ii) the data from the real-time photo request. Virtual view window program 144 determines the photograph characteristics that define a qualified photo. Photo characteristics can include, but are not limited to, cardinal direction of photo, pixel quality, clarity, time of day, etc. One having ordinary skill in the art will recognize that photo characteristics are stored as metadata on the data of the photo.

In various embodiments of the present invention depicted in FIG. 1, user preferences are stored on client application 142. User preferences can include, but are not limited to, photo selection rules, default photo settings, shooting angle correction settings, etc. One having ordinary skill in the art will understand that user preferences can be a set of default settings and/or can be settings or rules selected by a user of a computing device interacting with an interface being displayed on a computing device.

Virtual view window program 144 searches photo collection server 156 to identify a qualified photo based, at least in part, on the photo characteristics as recognized above. Photo collection server 156 stores data content (i.e., photographs, etc.). One having ordinary skill in the art will recognize that photo collection server 156 can store data content from various web-based programs. Photographs stored on photo collection server 156 are sorted by catalogue program 152. Catalogue program 152 operates to classify and/or identify photos based, at least in part, on tags (e.g., topic, title, content, location, position, direction, time, etc.) stored as metadata on the photographs. Virtual view window program 144 correlates photo characteristics identified in a real-time photo request with tags stored as metadata on the photographs to identify a qualified photo. In various embodiments, virtual view window program 144 identifies the photo characteristics and the tags and selects a photograph with the highest tier match between photo characteristics and tags. Virtual view window program 144 retrieves the identified photograph as a qualified photo. Upon identifying a qualified photo on photo collection server 156, virtual view window program 144 communicates the qualified photo to client device 120.

In various embodiment photo collection server 156 stores a plurality of photographs and data (i.e., metadata encompassing the geographical location and environmental characteristics depicted in the plurality of photographs). Furthermore, photo collection server 156 operates to store a plurality of photographs from internet-based webpages, social media sites, augmented reality gaming services and various internet-based organizations. Catalogue program 152 operates to retrieve the plurality of photographs and store the photographs on photo collection server 156. In some embodiments, a program not shown in FIG. 1 operates to communicate photographs to SAN 130 utilizing a network, such as network 110, and store various photo graphs on photo collection server 156.

In various embodiments, client device 120 receives a qualified photo from virtual view window program 144. Client device 120 utilizes client logic 123 to populate the qualified photo on the frame of client device 120. In some embodiments, a user of client device 120 interacts with the qualified photo by utilizing user interface 127. User interface 127 monitors the frame of client device 120 for interactions of the user and communicates this data to client logic 123. The user of client device 120 can submit satisfaction feedback regarding the qualified photo, utilizing user interface 127. One having ordinary skill in the art can recognize that satisfaction feedback indicates whether a user of a computing device was satisfied about the content being displayed on the computing device. User interface 127 transmits data regarding the satisfaction feedback to client logic 123. In some embodiments, client logic 123 stores the data regarding the satisfaction feedback on photo repository 146 and analyzes the data to update user preferences while generating a real-time photo request. In various embodiments, client logic 123 communicates the data regarding satisfaction feedback to feedback daemon 154. Feedback daemon 154 analyzes the data of satisfaction feedback to update user preferences stored on client application 142 and updates the tags used by catalogue program 152 to classify and/or identify photos stored on photo collection server 156. If feedback daemon 154 identifies that a positive feedback by the user of client device 120 regarding a qualified photo, feedback daemon 154 instructs virtual view window program 144 to store the qualified photo on photo repository 146 for retrieval in subsequent real-time photo requests.

In various embodiments, SAN 130 utilizes server application 132 to communicate between server system 140 and server system 150. Server application 132 communicates real-time photo request to server system 140 and server system 150. Server system 140 utilizes virtual view window program 144 to analyze the real-time photo request and determine a qualified photo to transmit to client device 120 based, at least in part, on the device's location, environment characteristics, and photo quality. Virtual view window program 144 communicates with client application 142 to determine a qualified photo based, at least in part, on a set of predefined user preferences. User preferences can be stored on server system 140 and/or client device 120. User preferences include, but are not limited to, photo selection parameters, photo settings, shooting angle correction settings, and user login information. Virtual view window program 144 communicates user preferences to feedback daemon 154. Feedback daemon 154 utilizes user preferences to determine satisfaction of a qualified photo and transmits the satisfaction data to virtual view window program 144 to further analyze the selection of a qualified photo. Satisfaction data is stored on photo repository 146, photo collection server 156, and/or client device 120, satisfaction data may also be stored on any storage device or server not shown in FIG. 1.

In various embodiments, feedback daemon 154 communicates with client logic 123 by utilizing network 110. Feedback daemon 154 communicates satisfaction data with client logic 123 based, at least in part, on a set of user preferences as recognized above. Feedback daemon 154 can request satisfaction data from client logic 123, where client logic 123 obtains environment characteristic data and/or device location data from sensors 121 and MVA 125. Client logic 123 analyzes the data and determines which satisfaction feedback data is communicated to feedback daemon 154 to be used to select a qualified photo. As recognized in the embodiments above, feedback daemon 154 communicates the satisfaction feedback data to virtual view window program 144 to assist in the retrieval of a qualified photo in various subsequent real-time photo requests. Virtual view window program 144 utilizes the satisfaction feedback data to select a qualified photo to communicate to client device 120. As recognize above, client device 120 utilizes client logic 123 to populate the qualified photo in the frame of client device 120.

Figure 2:
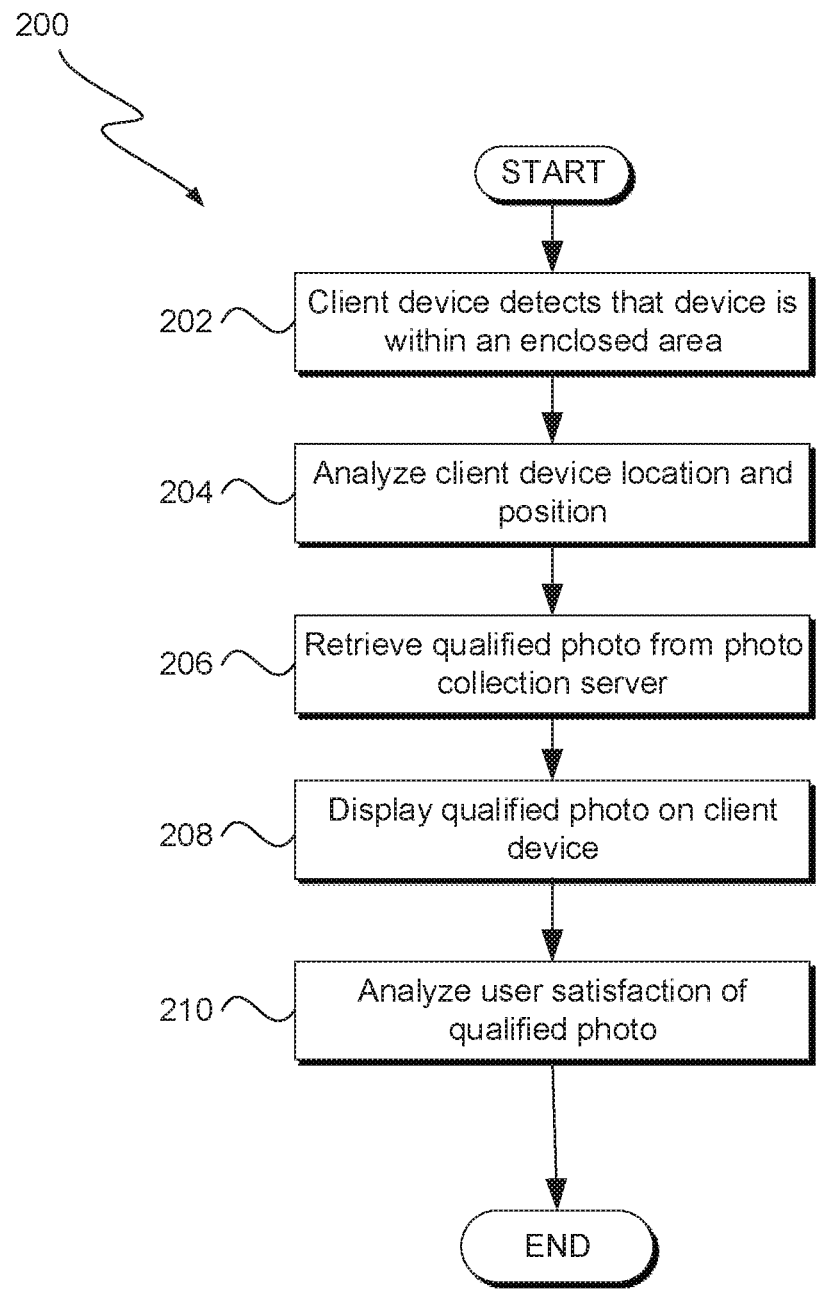
FIG. 2 illustrates operational processes of a virtual view window program executing on a computing device within the environment of FIG. 1, in accordance with at least one embodiment of the present invention.

FIG. 2 is a flowchart depicting operations for executing an AR system for a navigational machine vision in computing environment 100, in accordance with an illustrative embodiment of the present invention. More specifically, FIG. 2 depicts combined overall operations, 200, of client logic 123 and virtual view window program 144 executing on client device 120 and server system 140, respectively, to manage access to confidential and personal information stored on photo repository 146 and photo collection server 156 of server system 140 and server system 150, respectively. In some embodiments, however, operations 200 represents logical operations of server application 132, wherein interactions between virtual view window program 144 of server system 140, catalogue program 152 and/or feedback daemon 154 of server system 150, and sensors 121 and client logic 123 and/or MVA 125 of client device 120 represent interactions between logical units executing on client device 120. It should be appreciated that FIG. 2 provides an illustration of one implementation and does not imply any limitations with regard to the environments in which different embodiments may be implemented. Many modifications to the depicted environment may be made. In one embodiment of flowchart 200, the series of operations can be performed in any order. In another embodiment, the series of operations, of flowchart 200, can be performed simultaneously. Additionally, the series of operations, in flowchart 200, can be terminated at any operations. Additionally, any operation, of flowchart 200, can be resumed at any time.

In operation 202, client device 120 detects that client device 120 is within an enclosed area, utilizing, at least in part, sensors 121 and MVA 125. As recognized above, sensors 121 and MVA 125 monitors the geographical location and environment characteristics and communicates the data to client logic 123. Client logic 123 analyzes the data received from sensors 121 and MVA 125 and determines the location, position and other environmental characteristics of client device 120, as recognized above (operation 204). Client logic 123 generates a real-time photo request based, at least in part, (i) on the data analyzed by sensors 121 and MVA 125 and (ii) the user of client device 120 interacting with client device 120 utilizing user interface 127. Client logic 123 communicates the real-time photo request to SAN 130 utilizing network 110. Server application 132 retrieves the real-time photo request and communicates the request to virtual view window program 144. Virtual view window program 144 retrieves a qualified photo based, at least in part, on the features recognized above, as depicted in FIG. 1.

In operation 206, virtual view window program 144 retrieves a qualified photo from photo collection server, based at least in part, on the features recognized above. Virtual view window program 144 receives a real-time photo request and analyzes the data contained within the request to determine a qualified photo. In addition to analyzing the data contained within the request, virtual view window program 144 analyzes the user preferences, as recognized above, to further determine a qualified photo. Virtual view window program 144 operates to communicate with photo collection server 156 and identifies a qualified photo that matches the criteria identified in the user preferences and real-time photo request. Virtual view window program 144 retrieves a qualified photo from photo collection server 156 and communicates the qualified photo to client logic 123.

In operation 208, client logic 123 receives a qualified photo from virtual view window program 144. Client logic 123 transmits the qualified photo to user interface 127, and user interface 127 operates to display the qualified photo on the display screen of client device 120. The user is presented with the qualified photo that is displayed on the display screen of client device 120 and user interface 127 monitors the frame of the display screen for interactions by the user of client device 120. User interface 127 receives interactions made by the user of client device 120 include, but are not limited to, user satisfaction, request for a new qualified photo, saving the qualified photo for use at various other operations, etc. Client logic 123 retrieves the data collection of interactions detected by user interface 127 and transmits this data to client application 142 and/or stores the data on photo repository 146.

In operation 210, client logic 123 retrieves user satisfaction data from user interface 127 and analyzes the data to determine the level of satisfaction from the user of client device 120. Client logic 123 communicates the data to client application 142. Client application analyzes the data for various subsequent real-time photo requests and stores the data on photo repository 146.

Figure 3:
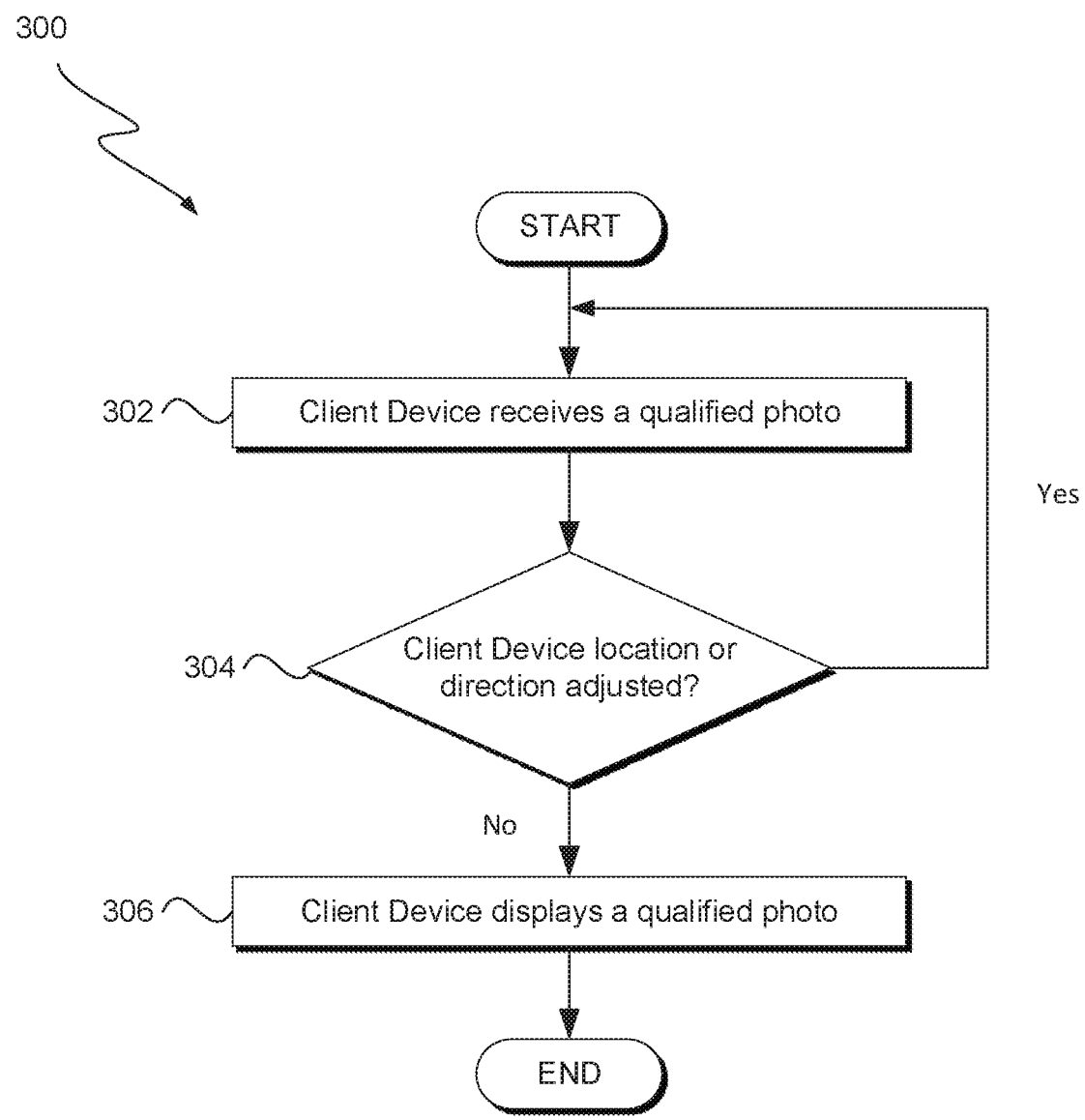
FIG. 3 illustrates operational processes of the virtual view window program executing operations to determine if a qualified photograph is communicated to a computing device within the environment of FIG. 1, in accordance with at least one embodiment of the present invention.

FIG. 3 is a flowchart depicting operations for executing operations on receiving a qualified photo and determining whether a request for another qualified photo is necessary based, at least in part, on the client device's location and environment characteristics within the computing environment 100 depicted in FIG. 1, in accordance with an embodiment of the present invention.

Operations 300 represents logical operations of client logic 123 that interact and influence operations 200 of virtual view window program 144 of server system 140, catalogue program 152 and/or feedback daemon 154 of server system 150, and sensors 121 and client logic 123 and/or MVA 125 of client device 120 represent interactions between logical units executing on client device 120, as depicted in FIG. 2. In some embodiments, operations 300 can include one or more elements of operations 200, in which case, interactions between operations 200 and 300 represent logic of client logic 123 and virtual view window program 144.

In operation 302, client device 120 receives a qualified photo, as recognized above, from virtual view window program 144. Client device 120 utilizes client logic 123 to communicate the qualified photo to user interface 127, and user interface 127 displays the qualified photo on the display screen to the user of client device 120. Client logic 123 operates to continuously monitor the data received from sensors 121 and MVA 125, as recognized above in the features above. If client logic 123 determines that the data of the geographical location and environmental characteristics have changed based, at least in part, on the a threshold value and the data differs from the data initially used to generate the real-time photo request (decision 304; YES branch), client logic 123 generates, at least, a second real-time photo request based on the second set of data from sensors 121 and MVA 125 and communicates the request to virtual view window program 144. If client logic 123 determines that, at least, a second qualified photo is required for the request, client logic 123 stores the first qualified photo in photo repository 146 for various subsequent requests. Virtual view window program 144 identifies, at least, a second qualified photo based, at least in part, on the request received from client logic 123 and communicates the, at least, second qualified photo to client logic 123. Client logic 123 transmits the, at least, second qualified photo to user interface 127 to display on the display screen of client device 120.

As recognized above, client logic 123 continuously monitors the data received from sensors 121 and MVA 125. If client logic 123 determines that the data of the geographical location and environmental characteristics have not changed based, at least in part, on the threshold value and the data is the same from the data initially used to generate the real-time photo request (decision 304; NO branch), client logic 123 transmits the qualified photo, initially retrieved, to user interface 127 to display on the display screen of client device 120.

In operation 306, as recognized in the embodiments above, client device 120 receives a qualified photo from virtual view window program 144. Client device 120 utilizes client logic 123 to transmit the qualified photo to user interface 127. User interface 127 displays the qualified photo on the display screen of client device 120.

Figure 4:
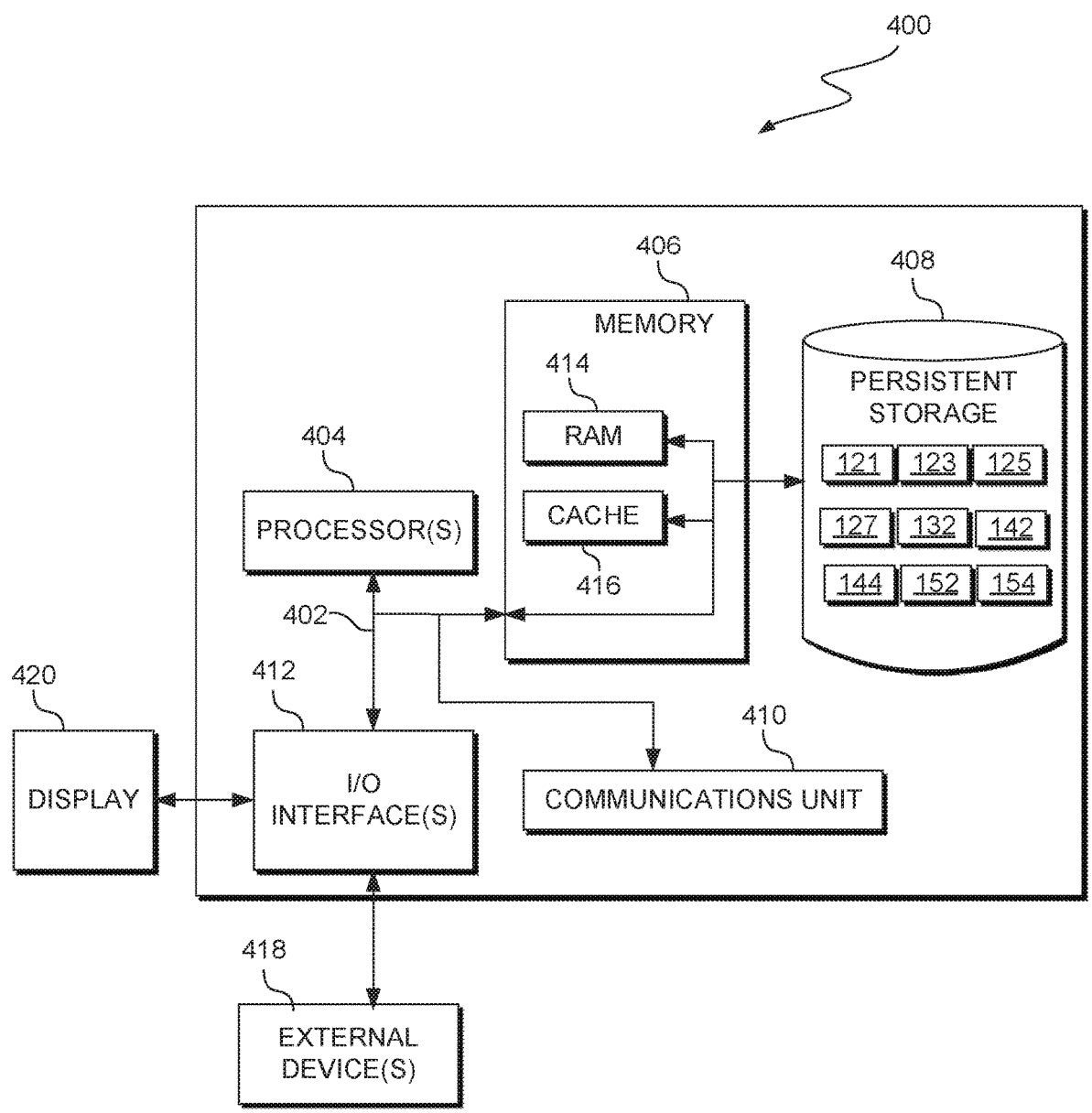
FIG. 4 is a block diagram of components of one or more computing devices within the computing environment depicted in FIG. 1, in accordance with at least one embodiment of the present invention.

FIG. 4 depicts a block diagram, 400, of components of computing environment 100, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 100 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Sensors 121, client logic 123, MVA 125, user interface 127, server application 132, client application 142, virtual view window program 144, catalogue program 152, and feedback daemon 154 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 110. In these examples, communications unit 410 includes one or more network interface cards. Communications unit 410 may provide communications through the use of either or both physical and wireless communications links. Sensors 121, client logic 123, MVA 125, user interface 127, server application 132, client application 142, virtual view window program 144, catalogue program 152, and feedback daemon 154 may be downloaded to persistent storage 408 through communications unit 410.

I/O interface(s) 412 allows for input and output of data with other devices that may be connected to computing device 100. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., Sensors 121, client logic 123, MVA 125, user interface 127, server application 132, client application 142, virtual view window program 144, catalogue program 152, and feedback daemon 154, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A method for executing an interactive augmented reality application, the method comprising:
   monitoring, by one or more processors, a geographical location of a user device and environmental characteristics of the user device, wherein the user device is located within an enclosed area, and wherein the environmental characteristics of the user device include environmental characteristics of an area outside of the enclosed area;
   determining, by the one or more processors, a viewpoint of the user device based, at least in part, on the geographical location of the user device and the environmental characteristics of the user device, wherein the viewpoint of the user device includes an angle of elevation of the user device and a cardinal direction of the user device;
   identifying, by the one or more processors, a digital image from a data repository, wherein the digital image is associated with (i) the geographical location of the user device and (ii) the viewpoint of the user device; and
   responsive to identifying the digital image, populating, by the one or more processors, an augmented reality application running on the user device with the digital image, wherein the digital image overlays a depiction of the real-world displayed on the user device, providing a virtual view window of the area outside of the enclosed area.

2. The method of claim 1, the method further comprising:
   identifying, by the one or more processors, the angle of elevation of the user device and the cardinal direction of the user device utilizing machine vision sensors.

3. The method of claim 2, the method further comprising:
   identifying, by the one or more processors, that the environmental characteristics include objects present within the digital image;
   analyzing, by the one or more processors, the environmental characteristics that include the objects present within the digital image; and
   determining, by the one or more processors, based, at least in part, on the analyzing, the objects' (i) identity, (ii) position, and (iii) orientation within the digital image.

4. The method of claim 1, wherein the data repository includes (i) an augmented reality gaming service, (ii) a social media site, and (iii) one or more internet-based webpages.

5. The method of claim 1, wherein the digital image is further associated with user preferences for digital image selection, wherein the user preferences include pixel quality, clarity, and time of day.

6. The method of claim 5, the method further comprising:
   identifying, by the one or more processors, a feedback interaction associated with the digital image from a user of the user device;
   determining, by the one or more processors, one or more additional user preferences based, at least in part, on the feedback interaction; and
   updating, by the one or more processors, the user preferences based, at least in part, on the determined one or more additional user preferences.

7. The method of claim 6, wherein the one or more user additional user preferences include (i) photo parameters, (ii) photo settings, (iii) shooting angle, and (iv) user login information.

8. A computer program product for executing an interactive augmented reality application, the computer program product comprising a computer readable storage device having program instructions embodied therewith, wherein the computer readable storage device is not a transitory signal per se, the program instructions readable by one or more processors to cause the one or more processors to execute a method comprising:
   monitoring a geographical location of a user device and environmental characteristics of the user device, wherein the user device is located within an enclosed area, and wherein the environmental characteristics of the user device include environmental characteristics of an area outside of the enclosed area;
   determining a viewpoint of the user device based, at least in part, on the geographical location of the user device and the environmental characteristics of the user device, wherein the viewpoint of the user device includes an angle of elevation of the user device and a cardinal direction of the user device;
   identifying a digital image from a data repository, wherein the digital image is associated with (i) the geographical location of the user device and (ii) the viewpoint of the user device; and
   in response to identifying the digital image populating an augmented reality application running on the user device with the digital image, wherein the digital image overlays a depiction of the real-world displayed on the user device, providing a virtual view window of the area outside of the enclosed area.

9. The computer program product of claim 8, the method further comprising:
identifying, by the one or more processors, the angle of elevation of the user device and the cardinal direction of the user device utilizing machine vision sensors.

10. The computer program product of claim 8, the method further comprising:
identifying that the environmental characteristics include objects present within the digital image;
analyzing the environmental characteristics that include the objects present within the digital image; and
determining the objects' (i) identity, (ii) position, and (iii) orientation present within the digital image.

11. The computer program product of claim 8, wherein the data repository includes (i) an augmented reality gaming service, (ii) a social media site, and (iii) one or more internet-based webpages.

12. The computer program product of claim 8, wherein the digital image is further associated with user preferences for digital image selection, wherein the user preferences include pixel quality, clarity, and time of day.

13. The computer program product of claim 12, the method further comprising:
identifying a feedback interaction associated with the digital image from a user of the user device;
determining one or more additional user preferences based, at least in part, on the feedback interaction; and
updating the user preferences based, at least in part, on the determined one or more additional user preferences.

14. The computer program product of claim 13, wherein the one or more additional user preferences include (i) photo parameters, (ii) photo settings, (iii) shooting angle, and (iv) user login information.

15. A computer system for an interactive augmented reality application, the computer system comprising:
one or more computer processors;
one or more computer readable storage medium; and
program instructions stored on the computer readable storage medium for execution by at least one of the one or more processors, the stored program instructions comprising:
program instructions to monitor a geographical location of a user device and environmental characteristics of the user device, wherein the user device is located within an enclosed area, and wherein the environmental characteristics of the user device include environmental characteristics of an area outside of the enclosed area;
program instructions to determine a viewpoint of the user device based, at least in part, on the geographical location of the user device and the environmental characteristics of the user device, wherein the viewpoint of the user device includes an angle of elevation of the user device and a cardinal direction of the user device;
program instructions to identify a digital image from a data repository, wherein the digital image is associated with (i) the geographical location of the user device and (ii) the viewpoint of the user device; and
program instructions to respond to identifying the digital image populating an augmented reality application running on the user device with the digital image, wherein the digital image overlays a depiction of the real-world displayed on the user device, providing a virtual view window of the area outside of the enclosed area.

16. The computer system of claim 15, the stored program instructions further comprising:
program instructions to identify the angle of elevation of the user device and the cardinal direction of the user device utilizing machine vision sensors.

17. The computer system of claim 16, the stored program instructions further comprising:
program instructions to identify that the environmental characteristics include objects present within the digital image;
program instructions to analyze the environmental characteristics that include the objects present within the digital image; and
program instructions to determine based, at least in part, on the analyzing, the objects' (i) identity, (ii) position, and (iii) orientation within the digital image.

18. The computer system of claim 15, wherein the data repository includes (i) an augmented reality gaming service, (ii) a social media site, and (iii) one or more internet-based webpages.

19. The computer system of claim 15, wherein the digital image is further associated with user preferences for digital image selection, wherein the user preferences include pixel quality, clarity, and time of day.

20. The computer system of claim 19, the stored program instructions further comprising:
program instructions to identify a feedback interaction associated with the digital image from a user of the user device;
program instructions to determine one or more additional user preferences based, at least in part, on the feedback interaction; and
program instructions to update the user preferences based, at least in part, on the determined one or more additional user preferences.

* * * * *